United States Patent
Lee (10) Patent No.: US 9,473,473 B2
(45) Date of Patent: Oct. 18, 2016

(54) DATA ACCESSING METHOD AND SYSTEM AND MEMORY STORAGE APPARATUS

(71) Applicant: PHISON ELECTRONICS CORP., Miaoli (TW)

(72) Inventor: Chien-Fu Lee, Yunlin County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 14/640,029

(22) Filed: Mar. 6, 2015

(65) Prior Publication Data

US 2016/0191475 A1 Jun. 30, 2016

(30) Foreign Application Priority Data

Dec. 27, 2014 (TW) .............................. 103145942 A (51) Int. Cl.
*G06F 21/46* (2013.01)
*H04L 29/06* (2006.01)
*G06F 21/62* (2013.01)
*G06F 21/31* (2013.01)
*H04W 12/06* (2009.01)
*G06F 21/78* (2013.01)

(52) U.S. Cl.
CPC ............ *H04L 63/0492* (2013.01); *G06F 21/31* (2013.01); *G06F 21/6218* (2013.01)

(58) Field of Classification Search
None
See application file for complete search history.

(56) References Cited

U.S. PATENT DOCUMENTS

| | | | | |
|---|---|---|---|---|
| 8,880,055 | B1 * | 11/2014 | Clement ............ | G06Q 20/3278 455/410 |
| 2003/0234719 | A1 * | 12/2003 | Denison ............. | G07C 9/00309 340/5.23 |
| 2004/0103288 | A1 * | 5/2004 | Ziv ..................... | G06F 12/1466 713/185 |
| 2008/0065897 | A1 * | 3/2008 | Jayaram .................. | G06F 21/84 713/183 |
| 2008/0244734 | A1 * | 10/2008 | Okaue ..................... | G06F 21/32 726/19 |
| 2010/0031349 | A1 * | 2/2010 | Bingham ................ | G06F 21/31 726/20 |
| 2010/0234068 | A1 * | 9/2010 | Bolton .................. | H04L 9/3234 455/557 |
| 2011/0131649 | A1 * | 6/2011 | Lang ....................... | G06F 21/79 726/19 |
| 2011/0307724 | A1 * | 12/2011 | Shaw .................... | G06F 21/305 713/323 |

(Continued)

FOREIGN PATENT DOCUMENTS

| | | |
|---|---|---|
| TW | 200720937 | 6/2007 |
| TW | 201201111 | 1/2012 |

OTHER PUBLICATIONS

CN101796525A. English Translation. Aug. 4, 2010.*

(Continued)

*Primary Examiner* — Venkat Perungavoor
(74) *Attorney, Agent, or Firm* — Jianq Chyun IP Office (57) ABSTRACT

A data accessing method and system for a memory storage apparatus are provided. The method includes: performing a near field communication between a memory storage apparatus and an electronic apparatus, and receiving a first password from the electronic apparatus by the memory storage device in the near field communication. The method also includes: recording the first password in a memory unit of the memory storage apparatus. The method further includes: when the memory storage apparatus is not connected to the electronic apparatus or a host in a predetermined time after the memory storage apparatus receives the first password, deleting the first password recorded in the memory unit; and when the first password recorded in the memory unit is the same as a second password in the memory storage apparatus, allowing the electronic apparatus or the host to access the memory storage apparatus by the memory storage apparatus.

9 Claims, 8 Drawing Sheets

(56) References Cited

U.S. PATENT DOCUMENTS

| | | | |
|---|---|---|---|
| 2012/0210122 A1* | 8/2012 | Woodward | H04L 9/0877 713/151 |
| 2013/0030608 A1* | 1/2013 | Taylor | B60L 1/003 701/2 |
| 2013/0174265 A1* | 7/2013 | Chan | G06F 12/1408 726/26 |
| 2014/0317420 A1* | 10/2014 | Daniels | G06F 21/6218 713/193 |

OTHER PUBLICATIONS

"Office Action of Taiwan Counterpart Application", issued on May 4, 2016, p. 1-p. 6.

* cited by examiner

| Tag identification | Registration information |
|---|---|
| 00100 | 123456 |

| Tag identification | Registration information |
|---|---|
|  |  |

| Tag identification | Registration information |
|---|---|
| 00111 | 654321 |

DATA ACCESSING METHOD AND SYSTEM AND MEMORY STORAGE APPARATUS

CROSS-REFERENCE TO RELATED APPLICATION

This application claims the priority benefit of Taiwan application serial no. 103145942, filed on Dec. 27, 2014. The entirety of the above-mentioned patent application is hereby incorporated by reference herein and made a part of this specification.

BACKGROUND

1. Technical Field

The present invention is related to a data accessing method, and more particularly to a method for accessing a memory storage apparatus via password and a data accessing system as well as a memory storage apparatus using said method.

2. Description of Related Art

The rapid development of digital cameras, mobile phones and MP3 stimulates significant growth of consumers' demand for storage media. Since the rewritable non-volatile memory is characterized in non-volatility of data, low power consumption, small volume, non-mechanical structure, and fast reading and writing speed, making it most suitable for portable electronic products. For example, a portable storage apparatus like a flash memory uses the rewritable non-volatile memory as its storage media inside the apparatus based on the characteristics of small volume and large capacity.

To enhance portability, the appearance design of the portable memory storage apparatus tends to be more compact nowadays, however, which makes it more likely to lose the portable memory storage apparatus and causes leakage of data. Therefore, more techniques that perform data coding and validation have been developed so as to protect the data in the portable memory storage apparatus. For example, the technique that requires users to input password to access the data begins to adopt multiple combinations of password to perform cross validation in order to enhance security of the data.

However, if a user is in a relatively secure environment, for example, the user uses his/her own electronic apparatus and portable storage apparatus, it would be very inconvenient if the user has to input a password every time when he/she is about to use the portable storage apparatus. Besides, a technique of protecting data with a password usually limits the number of password input attempts, and a portable storage apparatus will be locked if the number of invalid password input attempts exceeds a predetermined value. In this case, the user has to unlock the portable storage apparatus by using a special software or by going to a service center set up by the manufacturer of the portable storage apparatus, which is very troublesome and time-consuming.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The exemplary embodiment of the present invention provides a data accessing method, a data accessing system and a memory storage apparatus, which allow users to access the memory storage apparatus with password protection more conveniently.

An exemplary embodiment of the present invention provides a data accessing method for a memory storage apparatus. The method includes performing near field communication (NFC) between a memory storage apparatus and a first electronic apparatus, and receiving a first password from the first electronic apparatus through the NFC by the memory storage apparatus. The method also includes recording the first password in a memory unit of the memory storage apparatus. The method still includes, within a predetermined time after the first password is received from the first electronic apparatus through NFC by the memory storage apparatus, if the connection interface unit of the memory storage apparatus is not connected to a connection port of a second electronic apparatus, the first password recorded in the memory unit is deleted. The method further includes, if the first password recorded in the memory unit is identical to a second password stored in the memory storage apparatus, allowing the second electronic apparatus to access the memory storage apparatus.

An exemplary embodiment of the present invention provides a data accessing method for a memory storage apparatus. The method includes performing NFC between a memory storage apparatus and an electronic apparatus, and transmitting a tag identification corresponding to the memory storage apparatus from the memory storage apparatus to the electronic apparatus through NFC. The method further includes connecting a connection interface unit of the memory storage apparatus to a connection port of the electronic apparatus, and transmitting a tag identification corresponding to the memory storage apparatus from the memory storage apparatus to the electronic apparatus via the connection interface unit and the connection port. The method further includes, if the tag identification received via NFC is the same as the tag identification received via the connection port, the memory storage apparatus receives the first password from the electronic apparatus. The method further includes, if the first password is the same as a second password stored in the memory storage apparatus, allowing the electronic apparatus to access the memory storage apparatus.

An exemplary embodiment of the present invention provides a memory storage apparatus, which includes a connection interface unit, a rewritable non-volatile memory module and a memory control circuit unit. The connection interface unit is coupled to a host system. The memory control circuit unit is coupled to the connection interface unit and the rewritable non-volatile memory module. The memory control circuit unit and a first electronic apparatus perform NFC and the first electronic apparatus receives a first password through NFC. The memory control circuit unit records the first password in a memory unit of the memory storage apparatus. Meanwhile, within a predetermined time after the first password is received from the first electronic apparatus through NFC, if the connection interface unit of the memory storage apparatus is not connected to a connection port of a second electronic apparatus, the memory control circuit unit deletes the first password recorded in the memory unit. If the memory control circuit unit determines that the first password recorded in the memory unit is the same as a second password stored in the memory storage apparatus, the memory control circuit unit allows the second electronic apparatus to access the memory storage apparatus.

An exemplary embodiment of the present invention provides a memory storage apparatus which includes a connection interface unit, a rewritable non-volatile memory module and a memory control circuit unit. The connection interface unit is coupled to a host system. The memory control circuit unit is coupled to the connection interface unit and the rewritable non-volatile memory module. The memory control circuit unit and the electronic apparatus perform NFC. Through NFC, the memory control circuit unit transmits a tag identification corresponding to the memory storage apparatus to the electronic apparatus. The connection interface unit of the memory storage apparatus is connected to a connection port of the electronic apparatus. The memory control circuit unit transmits the tag identification corresponding to the memory storage apparatus from the memory storage apparatus to the electronic apparatus via the connection interface unit and the connection port. If the tag identification received through NFC is the same as the tag identification received via the connection port, the memory control circuit unit receives a first password from the electronic apparatus. Also, if the memory control circuit unit determines that the first password is the same as a second password stored in the memory storage apparatus, the memory control circuit unit allows the electronic apparatus to access the memory storage apparatus.

An exemplary embodiment of the present invention provides a data accessing system including a memory storage apparatus and a first electronic apparatus. The first electronic apparatus performs NFC with the memory storage apparatus, and the first electronic apparatus transmits a first password to the memory storage apparatus through NFC. After the memory storage apparatus receives the first password, the memory storage apparatus records the first password in a memory unit of the memory storage apparatus. Also, within a predetermined time after the first electronic apparatus transmits the first password to the memory unit of the memory storage apparatus through NFC, if the memory storage apparatus determines that the connection interface unit of the memory storage apparatus is not connected to the connection port of a first electronic apparatus, the first password recorded in the memory unit is deleted. If the memory storage apparatus determines that the first password recorded in the memory unit is the same as a second password stored in the memory storage apparatus, the memory storage apparatus allows the second electronic apparatus to access the memory storage apparatus.

An exemplary embodiment of the present invention provides a data accessing system including a memory storage apparatus and an electronic apparatus. The electronic apparatus performs NFC with the memory storage apparatus, and the memory storage apparatus transmits a tag identification corresponding to the memory storage apparatus to the electronic apparatus through NFC. If the electronic apparatus determines that the tag identification received through NFC is the same as a tag identification received via the connection port, the electronic apparatus transmits a first password to the memory storage apparatus. On the other hand, if the memory storage apparatus determines that the first password is the same as a second password stored in the memory storage apparatus, the memory storage apparatus allows the electronic apparatus to access the memory storage apparatus.

As indicated above, the data accessing method and system provided by the exemplary embodiments of the present invention allow password validation between the electronic apparatus and the memory storage apparatus to be completed quickly after the electronic apparatus and the memory storage apparatus perform NFC, such that the user can access the memory storage apparatus with password protection more efficiently. Since the electronic apparatus requests the user to input password via a log-in interface of the electronic apparatus under a passive mode of NFC and provided that the password of the memory storage apparatus is not present in the electronic apparatus (i.e., the user's first usage), the method and system for data accessing provided by the exemplary embodiment of the present invention not only provide a convenient way to control the right of accessing the memory storage apparatus, but also enhance the strength of data security via password protection.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the disclosure more comprehensible, embodiments accompanying figures are described in detail below.

DESCRIPTION OF EMBODIMENTS

Reference will now be made in detail to the present exemplary embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one," "one or more," and "and/or" are open-ended expressions that are both conjunctive and disjunctive in operation. For example, each of the expressions "at least one of A,B and C," "at least one of A, B, or C," "one or more of A, B, and C," "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Figure 1A:
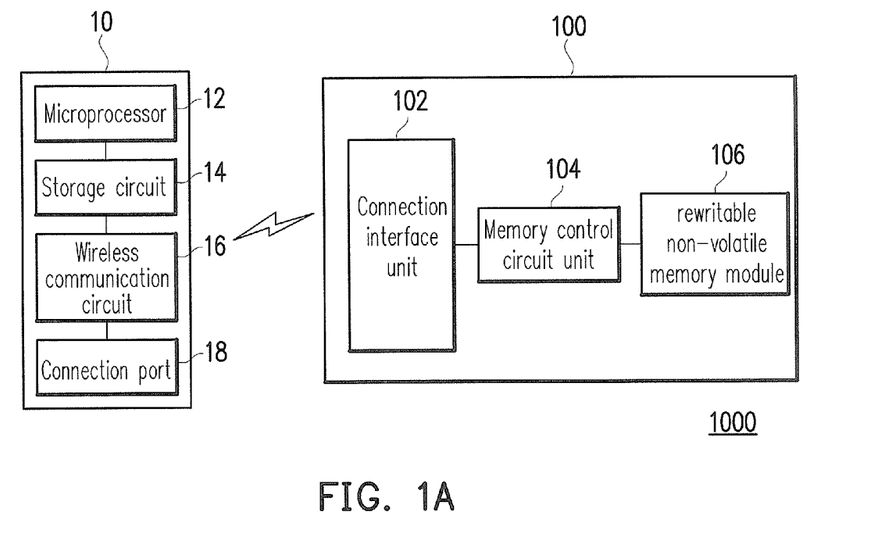
FIGS. 1A and 1B are schematic views illustrating a data accessing system according to a first exemplary embodiment.
Figure 1B:
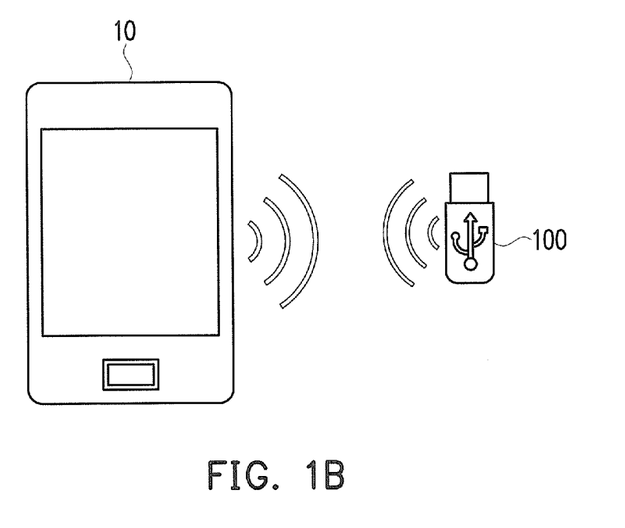

FIGS. 1A and 1B are schematic views illustrating a system for data accessing according to a first exemplary embodiment.

Referring to FIG. 1A, a data accessing system 1000 includes an electronic apparatus 10 and a memory storage apparatus 100. For example, the electronic apparatus 10 may be a mobile device, a personal digital assistant (PDA), a notebook computer, a tablet PC, a desktop computer and the like, or other electronic apparatuses that can use wireless communication network to perform communication and data transmission with the memory storage apparatus 100. The memory storage apparatus 100 may be a rewritable non-volatile memory storage apparatus such as a flash memory, a memory card or a solid state drive (SSD) and the like.

Referring to FIG. 1B, in the exemplary embodiment, the electronic apparatus 10 is exemplified as a mobile device, and the memory storage apparatus 100 is exemplified as a flash memory. For instance, in an exemplary embodiment of the present invention, the electronic apparatus 10 and the memory storage apparatus 100 both have the communication function that meets the near field communication (NFC) standard. Also, they perform communication as well as data transmission with each other via NFC to complete password validation between each other.

Specifically, NFC (also called "short distance wireless communication") is a standard and short-distance (e.g., within 10-20 centimeters) high frequency wireless communication technology which allows electronic apparatuses to perform two-way interaction in a simple and secure way. NFC is originated from known contactless identification and interconnectivity techniques. For example, NFC is developed from contactless radio frequency identification (RFID) which allows electronic apparatuses to perform contactless peer-to-peer data transmission, in which two reading modes, i.e., an active mode and a passive mode, are adopted.

More specifically, under the active mode, every apparatus that complies with NFC is equipped with a battery and generates an exclusive RF field to transmit data. Take the electronic apparatus 10 and the memory storage apparatus 100 as examples. After the electronic apparatus 10 emits a radio frequency signal to the memory storage apparatus 100, the memory storage apparatus 100 also emits a signal having an identical frequency to the electronic apparatus 10. Thereafter, they process the signals and each performs peer-to-peer data transmission by using exclusive the RF field emitted by themselves. In other words, under such mode, both of the electronic apparatus 10 and the memory storage apparatus 100 consume power; nevertheless, the connection speed is relatively faster and more stable.

On the other hand, under the passive mode, every apparatus that complies with NFC does not need to be equipped with a battery. Here, the electronic apparatus 10 and the memory storage apparatus 100 are taken as examples. In the communicating process, the electronic apparatus 10 with power may provide the RF field to transmit data to the memory storage apparatus 100. The memory storage apparatus 100 uses load modulation technique to return the data with the same speed. Specifically, the memory storage apparatus 100 transmits the required data based on NFC record type definition and data exchange format. For example, an ID identification emitted by the memory storage apparatus 100 is an RF energy emitted by the electronic apparatus 10 used as power required for data exchange. The specification of NFC data exchange format (NDEF) defines message encapsulation format so the electronic apparatus 10 and the memory storage apparatus 100 can exchange ID identification and information smoothly.

Referring to FIG. 1A again, the electronic apparatus 10 includes a microprocessor 12, a storage circuit 14, a wireless communication circuit 16 and a connection port 18.

The microprocessor 12 of the electronic apparatus 10 controls the overall operation of the electronic apparatus 10. For example, the microprocessor 12 is a central processing unit (CPU).

The storage circuit 14 is coupled to the microprocessor 12 for temporarily storing the command or data executed by the microprocessor 12. For instance, in the exemplary embodiment, the storage circuit 14 may be a dynamic random access memory (DRAM), a static random access memory (SRAM) and the like; however, it should be pointed out that the present invention is not limited thereto. The storage circuit 14 may be other suitable memory as well.

The wireless communication circuit 16 is coupled to the microprocessor 12 for communicating with other electronic apparatus or memory storage apparatus outside the electronic apparatus 10 via wireless communication network. For instance, a wireless communication circuit 16 of the electronic apparatus 10 communicates with the memory storage apparatus 100 via the wireless communication network. In the exemplary embodiment, the wireless communication circuit 16 communicates with an external electronic apparatus via NFC; however, it should be indicated that the present invention is not limited thereto. Other wireless communication network may be applied in the present invention.

The connection port 18 enables the memory storage apparatus 100 to be connected to the electronic apparatus 10. For example, the connection port 18 is a connector that meets universal serial bus (USB) standard; however, the present invention is not limited thereto. The connection port of the present invention may also comply with other suitable standards.

In the exemplary embodiment, the memory storage apparatus 100 includes a connection interface unit 102, a memory control circuit unit 104 and a rewritable non-volatile memory module 106.

The connection interface unit 102 complies with the USB standard; however, it should be indicated that the present invention is not limited thereto. The connection interface unit 102 may also comply with parallel advanced technology attachment (PATA) standard, institute of electrical and electronic engineers (IEEE) 1394 standard, peripheral component interconnect express (PCI Express) standard, serial advanced technology attachment (SATA) standard, ultra high speed-I (UHS-I) interface standard, ultra high speed-II (UHS-II) interface standard, secure digital (SD) interface standard, memory stick (MS) interface standard, multimedia card (MMC) interface standard, compact flash (CF) interface standard, integrated device electronics (IDE) standard, or other suitable standards. In the exemplary embodiment, the connector may be packaged in a chip along with the memory control circuit unit, or arranged outside a chip containing the memory control circuit unit.

The memory control circuit unit 104 executes a plurality of logic gates or control commands implemented in the form of hardware or firmware, and performs data writing, reading, erasing and combining in the rewritable non-volatile memory module 106 according to the commands of the electronic apparatus 10 or other electronic apparatus (e.g., computer host). In the exemplary embodiment, the memory control circuit unit 104 of the memory storage apparatus 100 performs password validation with the electronic apparatus 10 according to the method for data accessing described in the exemplary embodiment of the present invention, such that the memory storage apparatus 100 or other electronic apparatus (e.g., computer host) can access the rewritable non-volatile memory module 106.

The rewritable non-volatile memory module 106 is coupled to the memory control circuit unit 104 and stores data written by the electronic apparatus 10. In the exemplary embodiment, the rewritable non-volatile memory module 106 is a multi-level cell (MLC) NAND flash memory module (i.e., a flash memory module where one memory cell stores two bits of data); however, the present invention is not limited thereto. The rewritable non-volatile memory module 106 may also be a single-level cell (SLC) NAND flash memory module (i.e., a flash memory module where one memory cell stores one bit of data), a trinary level cell (TLC) NAND flash memory module (i.e., a flash memory module where one memory cell stores three bits of data), other flash memory modules, or other memory modules having the same characteristics.

Figure 2:
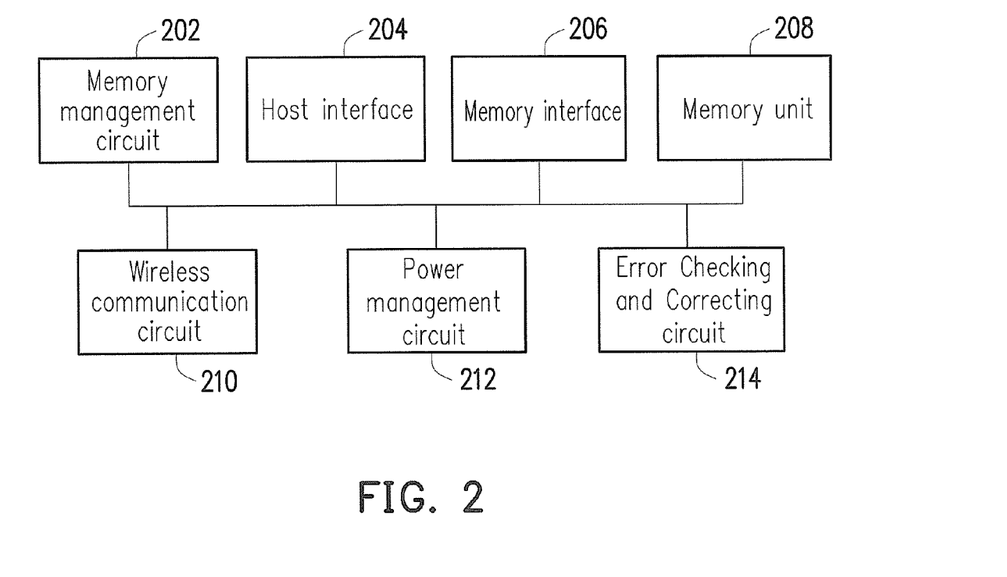
FIG. 2 is a schematic block diagram illustrating a memory control circuit unit according to the first exemplary embodiment.

FIG. 2 is a schematic block diagram illustrating a memory control circuit unit according to the first exemplary embodiment.

Referring to FIG. 2, the memory control circuit unit 104 includes a memory management circuit 202, a host interface 204, a memory interface 206, a memory unit 208 and a wireless communication circuit 210.

The memory management circuit 202 controls the overall operation of the memory control circuit unit 104. Specifically, the memory management circuit 202 has a plurality of control instructions. When the memory storage device 100 is enabled, the control instructions are executed to perform operations to the rewritable non-volatile memory module 106 such as writing data into the rewritable non-volatile memory module 106, reading data from the rewritable non-volatile memory module 106, or erasing data from the rewritable non-volatile memory module 106, etc.

In this exemplary embodiment, the control instructions of the memory management circuit 202 are implemented in the form of firmware. For example, the memory management circuit 202 has a microprocessor unit (not shown) and a read-only memory (not shown). Also, the control commands are burnt into the read-only memory. When the memory storage device 100 is operated, the control commands are executed by the microprocessor unit for performing operations such as data writing, reading and erasing, etc.

In another exemplary embodiment, the control instructions of the memory management circuit 202 may also be stored in a form of programming codes in a specific area of the rewritable volatile memory module 106 (e.g., the system area specifically designated for storing the system data in the memory module). Besides, the memory management circuit 202 has the microprocessor unit (not shown), a read-only memory (not shown), and a random access memory (not shown). In particular, the read-only memory stores boot codes, and when the memory control circuit unit 104 is enabled, the microprocessor unit firstly executes the boot codes to load the control commands stored in the rewritable non-volatile memory module 106 to the random access memory of the memory management circuit 202. Afterwards, the microprocessor unit executes the control commands for various data operations such as data writing, reading and erasing operations.

Also, in another exemplary embodiment, the control commands of the memory management circuit 202 may also be implemented in the form of hardware. For example, the memory management circuit 202 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. In addition, the memory cell management circuit is configured to manage physical erasing units of the rewritable non-volatile memory module 106. The memory writing circuit is configured to send a write command to the rewritable non-volatile memory module 106 to write data to the rewritable non-volatile memory module 106. The memory reading circuit is configured to send a read command to the rewritable non-volatile memory module 106 to read data from the rewritable non-volatile memory module 106. The memory erasing circuit is configured to send an erasing command to the rewritable non-volatile memory module 106 to erase data from the rewritable non-volatile memory module 106. The data processing circuit is configured to process data to be written to the rewritable non-volatile memory module 106 and data to be read from the rewritable non-volatile memory module 106.

The host interface 204 is coupled to the memory management circuit 202 and configured to be coupled to the connection interface unit 102 to receive and identify commands and data transmitted by the electronic apparatus 10 or other electronic apparatus (e.g., computer host). In other words, the commands and data from the electronic apparatus 10 or other electronic apparatus (e.g., computer host) are transmitted to the memory management circuit 202 through the host interface 204. In the present exemplary embodiment, the host interface 204 is compatible with the SATA standard. However, it should be understood that the invention is not limited thereto. The host interface 204 may also be compatible with the PATA standard, the IEEE 1394 standard, the PCI Express standard, the USB standard, the UHS-I interface standard, the UHS-II interface standard, the SD standard, the MS standard, the MMC standard, the CF standard, the IDE standard, or other suitable data transmission standard.

The memory interface 206 is coupled to the memory management circuit 202 and accesses the rewritable non-volatile memory module 106. In other words, data to be written into the rewritable non-volatile memory module 106 are converted into a format acceptable for the rewritable non-volatile memory module 106 by the memory interface 206.

The memory unit 208 is coupled to the memory management circuit 202 and configured to temporarily store the data and command from the electronic apparatus 10 or other electronic apparatus (e.g., computer host) or the data from the rewritable non-volatile memory module 106.

The wireless communication circuit 210 is coupled to the memory management circuit 202 and configured to communicate with other electronic apparatus outside the memory storage apparatus 100 via wireless communication network. For example, in the present exemplary embodiment, the wireless communication circuit 210 communicates with an external electronic apparatus through NFC.

In an exemplary embodiment, the memory control circuit unit 104 further includes a power management circuit 212 and an error checking and correcting circuit 214.

The power management circuit 212 is coupled to the memory management circuit 202 and configured to control a power source of the memory storage apparatus 100.

The error checking and correcting circuit 214 is coupled to the memory management circuit 202 and configured to perform an error checking and correcting operation to ensure correctness of data. Specifically, when the memory management circuit 202 receives a write command from the electronic apparatus 10, the error checking and correcting circuit 214 generates a corresponding error checking and correcting code (ECC Code) for the data corresponding to the write command. In addition, the memory management circuit 202 writes the data corresponding to the write command and the corresponding error checking and correcting code into the rewritable non-volatile memory module 106. Afterwards, when reading data from the rewritable non-volatile memory module 106, the memory management circuit 202 also reads the error checking and correcting code corresponding to the data. In the meantime, the error checking and correcting circuit 2014 performs an error checking and correcting operation to the read data according to the error checking and correcting code.

Figure 3A:
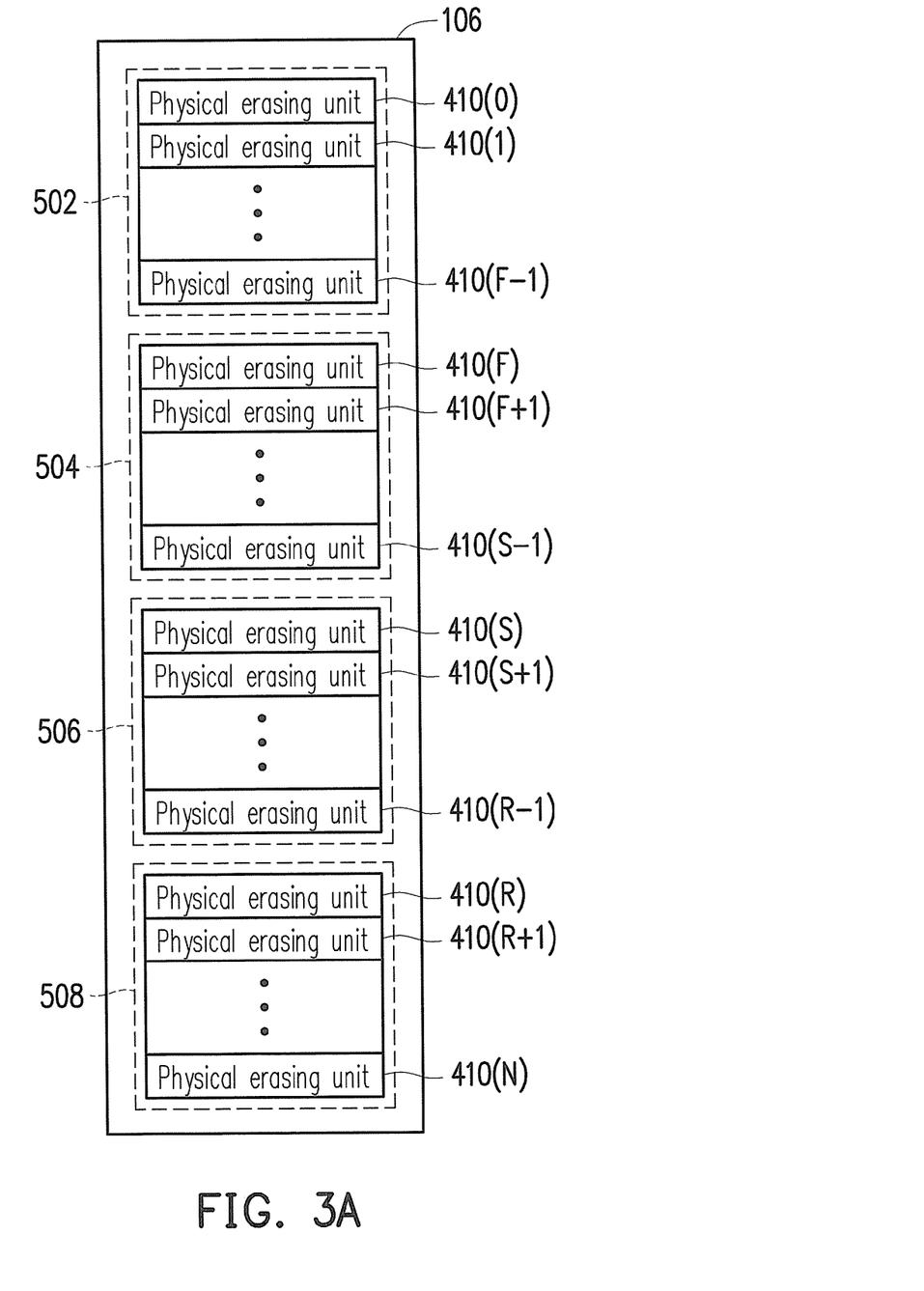
FIGS. 3A and 3B are exemplary diagrams of managing physical erasing units according to the first exemplary embodiment.
Figure 3B:
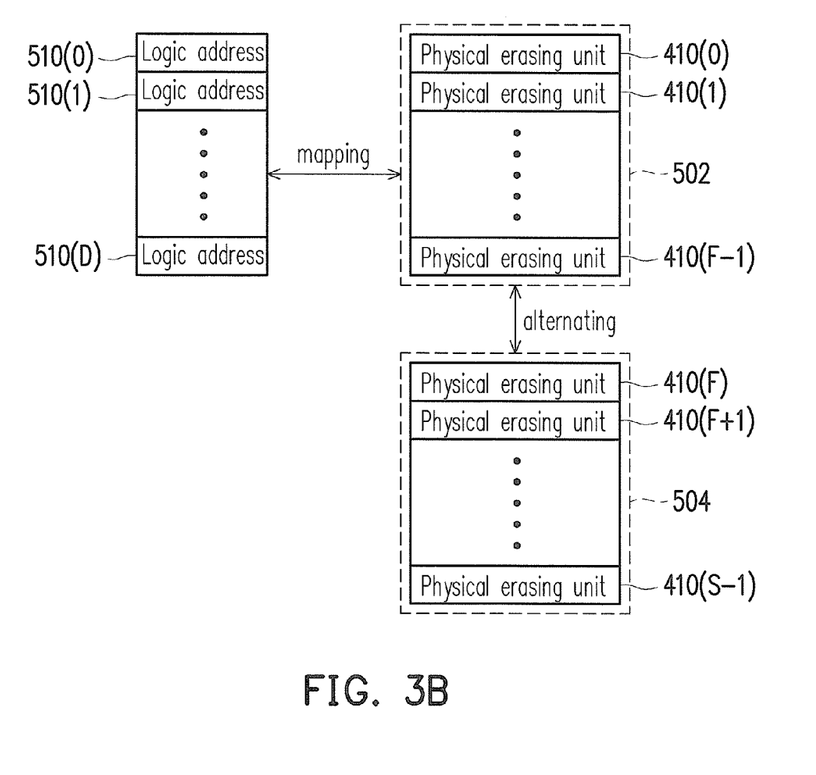

FIGS. 3A and 3B are exemplary diagrams of managing physical erasing units according to the first exemplary embodiment.

It should be understood that terms, such as "get," "group," "divide," "associate" and so forth, are logical concepts which describe operations in the physical erasing units of the rewritable non-volatile memory module 106. That is, the physical erasing units of the rewritable non-volatile memory module are logically operated, but actual positions of the physical units of the rewritable non-volatile memory module are not changed.

In the exemplary embodiment, the rewritable non-volatile memory module 106 includes a plurality of physical erasing units. Each of the physical erasing unit includes a plurality of physical programming units, and a plurality of logic addresses are configured to be mapped to a portion of the physical programming units. Referring to FIG. 3A, specifically, the rewritable non-volatile memory module 106 has physical erasing units 410(0)-410-(N). For example, the physical erasing units 410(0)-410-(N) may belong to the same memory die or different memory die. Each of the physical erasing units has multiple physical programming units respectively, wherein the physical programming units that belong to the same physical erasing unit may be independently written and erased at the same time. In addition, each of the physical erasing units may constitute of 64 physical programming units, 256 physical programming units or other random amount of physical programming units.

More specifically, the physical erasing unit is a minimum unit for erasing operation. That is to say, each of the physical erasing units has a minimum number of memory cells for being erased altogether. The physical programming unit is a minimum unit for programming operation. In other words, the physical programming unit is the minimum unit for writing data. Each physical programming unit usually includes a data bit area and a redundant bit area. The data bit area includes a plurality of physical accessing addresses, and is configured to store user data. The redundant bit area is configured to store system data (e.g., control information and error checking and correcting (ECC) codes). In the exemplary embodiment, the data bit area of each physical programming unit includes 4 physical accessing addresses, and a size of a physical accessing address is 512 byte. However, in other exemplary embodiment, the data bit area may include more or less physical accessing addresses. The embodiment of the present invention does not limit the size and number of the physical accessing addresses. For instance, in an exemplary embodiment, the physical erasing unit is a physical block, and the physical programming unit is a physical page or a physical sector. However, the present invention is not limited thereto.

The physical erasing units 410(0)-410(N) of the memory control circuit unit 104 (or memory management circuit 202) are logically grouped into a data area 502, a spare area 504, a system area 506, and a replacement area 508.

The physical erasing unit logically belonging to the data area 502 and the spare area 504 is configured to store data from the electronic apparatus 10. Specifically, the physical erasing unit of the data area 502 is regarded as the physical erasing unit that already stores data, and the physical erasing unit of the spare area 504 is used for substituting the physical erasing unit of the data area 502. That is to say, when the electronic apparatus 10 receives the write command and data to be written, the memory management circuit 202 gets a physical erasing unit from the spare area 504 and writes the data into the gotten physical erasing unit so as to substitute the physical erasing unit of the data area 502.

The physical erasing units logically belonging to the system area 506 are configured to record system data which includes information related to the manufacturer and model number of the rewritable non-volatile memory module 106, the amount of the physical erasing units in the rewritable non-volatile memory module 106, the amount of the physical programming units in each physical erasing unit, and so forth.

The physical erasing logically belonging to the replacement area 508 are used for replacement operation of damaged physical erasing units to replace the damaged physical erasing units. Specifically, if there is still a normal physical erasing unit in the replacement area 508 and the physical erasing unit belonging to the data area 502 is damaged, the memory management circuit 202 may get the normal physical erasing unit in the replacement area 508 to replace the damaged physical erasing unit.

Also, the amounts of the data area 502, the spare area 504, the system area 506, and the replacement area 508 may differ as specifications of memories differ. Besides, it should be understood that in an operation of the memory storage apparatus 100, grouping relations of the physical erasing units grouped to the data area 502, the spare area 504, the system area 506, and the replacement area 508 change dynamically. For example, when the physical erasing unit in the spare area 504 is damaged and replaced by the physical erasing unit in the replacement area 508, the physical erasing unit originally grouped to the replacement area 508 is associated with the spare area 504.

Referring to FIG. 3B, as described above, the physical erasing units of the data area 502 and the spare area 504 stores the data written by the electronic apparatus 10 in an alternating method. In the present exemplary embodiment, the memory control circuit unit 104 (or memory management circuit 202) configures the logical addresses 510(0)-510(D) to the electronic apparatus 10 or other electronic apparatus (e.g., computer host) to be mapped to a portion of the physical erasing units 414(0)-410(F−1) in the data area 502 to access the data stored in the physical erasing units by the above alternating method. In particular, the electronic apparatus 10 or other electronic apparatus (e.g., computer host) may access the data in the data area 502 through the logic addresses 510(0)-510(D). Herein, the memory control circuit unit 104 (or the memory management circuit 202) establishes a logic address-physical erasing unit mapping table to record mapping relationships between the logical addresses and the physical erasing units. The logic address-physical erasing unit mapping table may also, for example, record various logical and physical corresponding relations such as a mapping relation between the logic addresses and the physical programming units, the logic programming units and the physical programming units and/or logic programming units and the physical erasing units; the invention is not limited thereto.

As indicated above, the electronic apparatus 10 and the memory storage apparatus 100 are respectively provided with the wireless communication circuit 16 and the wireless communication circuit 210 that comply with the NFC standard. Accordingly, when the electronic apparatus 10 and the memory storage apparatus 100 are close to each other, the electronic apparatus 10 performs NFC with the memory storage apparatus 100. In an exemplary embodiment, the active mode of NFC is used as an example to describe the data accessing method of the present invention. That is, in the embodiment, the electronic apparatus 10 and the memory storage apparatus 100 are both equipped with a battery (not shown). After the electronic apparatus 10 performs NFC with the memory storage apparatus 100, the electronic apparatus 10 transmits a password (hereafter "first password") to the memory storage apparatus 100 through NFC. Thereafter, the memory storage apparatus 100 records the first password in a memory unit 208 of the memory storage apparatus 100. When it is determined that the first password recorded in the memory unit 208 is the same as another password (hereafter "second password") initially stored in the memory storage apparatus 100, the memory storage apparatus 100 allows the electronic apparatus 10 or a computer host to access the memory storage apparatus 100.

It should be noted that, in the exemplary embodiment, the first password transmitted by the electronic apparatus 10 and the second password initially stored in the memory storage apparatus 100 may be set during the manufacturing process or set by firmware or software after the manufacturing process, which should be not construed as a limitation to the present invention. For example, a plurality of the electronic apparatuses 10 and a plurality of the memory storage apparatuses 100 may be pre-matched before the manufacturing process is completed. That is, the first password of each electronic apparatus 10 is set to correspond to the second password in one or more memory storage apparatuses 100. However, the way of setting the first and second passwords is not limited in the present invention. For example, in another exemplary embodiment, the user may set the first password of each electronic apparatus 10 and the corresponding second password of one or more memory storage apparatuses 100 using an application provided by the electronic apparatus 10. Alternatively, the software application provided by the electronic apparatus 10 inherently generates the first password corresponding to the memory storage apparatus 100. In particular, the way of matching the electronic apparatus 10 and the memory storage apparatus 100 is not limited in the present invention. For instance, in another exemplary embodiment, the user may set or generate a plurality of first passwords of the electronic apparatus 10 via the application provided by the electronic apparatus 10, such that the plurality of first passwords respectively correspond to the second password of memory storage apparatuses of the user.

Here, the first password may be stored in the storage circuit 14 of the electronic apparatus 10 after being set, and the second password may be stored in a buffer memory or memory unit 208 of the memory storage apparatus 100 after being set; however, the present invention is not limited thereto. For example, in another exemplary embodiment, the memory management circuit 202 may divide the logic addresses 510(0)-510(D) into a first divided area and a second divided area. The physical erasing unit corresponding to the first divided area records the second password that has been set before the manufacturing of the memory storage apparatuses 100 is completed. The physical erasing unit corresponding to the second divided area is a hidden divided area that can be accessed through password validation.

In particular, in the exemplary embodiment, within a predetermined time (e.g. 10 seconds) after the first password is transmitted to the memory unit 208 of the memory storage apparatuses 100 by the electronic apparatus 10 via NFC, if the user would like to access the memory storage apparatuses 100, he may connect the connection interface unit 102 of the memory storage apparatuses 100 to the connection port 18 of the electronic apparatus 10 or the connection port of another electronic apparatus (e.g., computer host) within the predetermined time. Here, in a case where the memory management circuit 202 of the memory storage apparatuses 100 determines that the first password recorded in the memory unit 208 is the same as the second password initially stored in the memory storage apparatuses 100, when the memory management circuit 202 receives a read command from the electronic apparatus 10 or another electronic apparatus (e.g., computer host) connected to the memory storage apparatuses 100 and provided that the read command instructs to read a first logic address mapped to the first physical programming unit among the logic addresses 510(0)-510(D), the memory management circuit 202 uses the first password to decode the data stored in the first physical programming unit among the physical programming unit to acquire the decoded data, and transmits the decoded data to the electronic apparatus 10 or another electronic apparatus (e.g., computer host) to respond to the received read command.

It should be pointed out that the password validation operation is not limited in the present invention. For example, in another exemplary embodiment, the memory storage apparatus 100 is divided to have a hidden divided area. The memory management circuit 202 determines whether to provide the hidden divided area to the electronic apparatus 10 or another electronic apparatus (e.g., computer host) for accessing according to the first password. In addition, the length of the predetermined time is not limited in the present invention. For example, in another exemplary embodiment, the predetermined time may be set according to the level of security required by the user.

In the exemplary embodiment, when the connection interface unit 102 of the memory storage apparatus 100 and the connection port 18 of the electronic apparatus 10 or the connection port of the computer host are disconnected, the memory management circuit 202 of the memory storage apparatus 100 deletes the first password recorded in the memory unit 208 so as to avoid leakage of the data in the flash memory when the flash memory is taken by other people by mistake. Moreover, within the predetermined time after the first password is transmitted to the memory unit 208 of the memory storage apparatus 100 by the electronic apparatus 10 via NFC, if the memory management circuit 202 of the memory storage apparatus 100 determines that the connection interface unit 102 of the memory storage apparatus 100 is not connected to the connection port 18 of the electronic apparatus 10 or the connection port of other electronic apparatus (e.g., computer host), the memory management circuit 202 also deletes the first password recorded in the memory unit 208 to ensure that the data in the flash memory can be accessed by owner of the apparatus.

Figure 4:
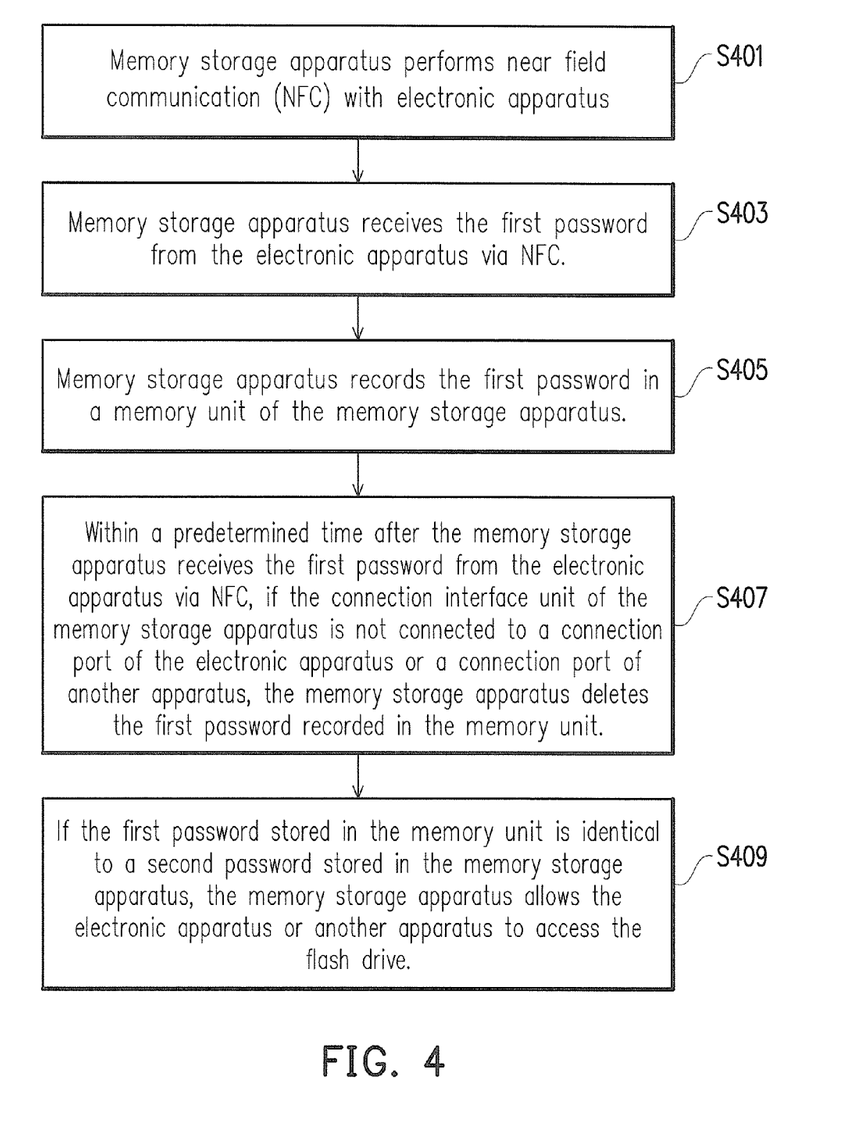
FIG. 4 is a flowchart of a data accessing method according to the first exemplary embodiment.

FIG. 4 is a flowchart of a data accessing method according to the first exemplary embodiment.

Referring to FIG. 4, in step S401, the memory storage apparatus 100 performs NFC with the electronic apparatus 10.

In step S403, the memory storage apparatus 100 receives the first password from the electronic apparatus 10 through NFC.

Then, in step S405, the memory storage apparatus 100 records the first password in the memory unit 208 of the memory storage apparatus 100.

In step S407, within a predetermined time after the memory storage apparatus 100 receives the first password from the electronic apparatus 10 through NFC, if the connection interface unit of the memory storage apparatus 100 is not connected to the connection port of the electronic apparatus 10 or the connection port of another electronic apparatus (e.g., the host), the memory storage apparatus 100 deletes the first password recorded in the memory unit 208.

Next, in step S409, if the first password recorded in the memory unit 208 is the same as the second password stored in the memory storage apparatus 100, the memory storage apparatus 100 will allow the electronic apparatus 10 or another electronic apparatus (e.g., the host) to access the memory storage apparatus.

Second Exemplary Embodiment

The data accessing method and system described in the second exemplary embodiment are substantially the same as those described in the first exemplary embodiment. The difference lies in that, in the second exemplary embodiment, the password validation between the electronic apparatus and the memory storage apparatus is performed under the passive mode of NFC. In the following paragraphs, the difference between the second exemplary embodiment and the first exemplary embodiment is described by using the system and reference numbers of the elements mentioned in the first exemplary embodiment.

In the present exemplary embodiment, the electronic apparatus 10 and the memory storage apparatus 100 are respectively provided with the wireless communication circuit 16 and the wireless communication circuit 210 that comply with the NFC standard. Accordingly, when the electronic apparatus 10 and the memory storage apparatus 100 are close to each other, the electronic apparatus 10 and the memory storage apparatus 100 will perform NFC. In the exemplary embodiment, the passive mode of NFC is used as an example to describe the method for data accessing of the present invention. For example, the memory storage apparatus 100 in the embodiment is not provided with a battery. After the electronic apparatus 10 and the memory storage apparatus 100 perform NFC, the memory management circuit 202 of the memory storage apparatus 100 transmits a tag identification corresponding to the memory storage apparatus 100 to the electronic apparatus 10 through NFC. Subsequently, when the connection interface unit 102 of the memory storage apparatus 100 is connected to the connection port 18 of the electronic apparatus 10, the memory management circuit 202 transmits the tag identification corresponding to the memory storage apparatus 100 to the electronic apparatus 10 via the connection interface unit 102 and the connection port 18. If the electronic apparatus 10 determines that the tag identification received through NFC is the same as the tag identification received via the connection port 18, the electronic apparatus 10 transmits the first password to the memory storage apparatus 100. Thereafter, the memory management circuit 202 of the memory storage apparatus 100 records the first password in the memory unit 208 of the memory storage apparatus. When it is determined that the first password recorded in the memory unit 208 is identical to the second password initially stored in the memory storage apparatus 100, the memory management circuit 202 allows the electronic apparatus 10 to access the memory storage apparatus 100.

It should be indicated that, after the electronic apparatus 10 performs NFC with the memory storage apparatus 100 and the memory storage apparatus 100 transmits the tag identification corresponding to the memory storage apparatus 100 to the electronic apparatus 10 through NFC, if the user connects the connection interface unit of another flash memory to the connection port 18 of the electronic apparatus 10, it is likely that the second password stored in said another flash memory will be blocked by the electronic apparatus 10 via the connection interface unit of said another flash memory. In the exemplary embodiment, since the electronic apparatus 10 receives the tag identification from the memory storage apparatus 100 through NFC as well as the tag identification transmitted via the connection port 18 and determines whether the two passwords are identical or not, whereby avoiding the circumstances where the passwords are retrieved as mentioned above.

Specifically, in the operation where the electronic apparatus 10 transmits the first password to the memory storage apparatus 100, firstly the electronic apparatus 10 determines whether there is a registration record corresponding to the memory storage apparatus 100 according to a registration list recorded in the electronic apparatus 10. If the registration list has a registration record corresponding to the memory storage apparatus 100, the electronic apparatus 10 obtains the first password from the registration list and transmits the first password obtained from the registration list to the memory storage apparatus 100. On the other hand, if the registration list does not have the registration record corresponding to the memory storage apparatus 100, the electronic apparatus 10 displays a log-in interface to request the user to input registration information and records the registration information as well as the tag identification corresponding to the memory storage apparatus 100 in the registration list. For example, the log-in interface displayed by the electronic apparatus 10 requests the user to input a password to access the memory storage apparatus 100, and the memory storage apparatus 100 records the received password as the first password in the registration list. In other words, the registration information includes the first password.

Figure 5:
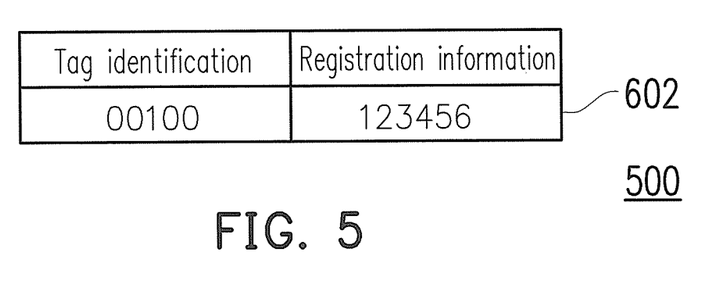
FIG. 5 is a schematic view illustrating a registration list recorded in an electronic apparatus according to a second exemplary embodiment.

FIG. 5 is a schematic view illustrating a registration list recorded in an electronic apparatus according to a second exemplary embodiment.

Referring to FIG. 5, more specifically, in the exemplary embodiment, it is assumed that the tag identification corresponding to the memory storage apparatus 100 received by the electronic apparatus 10 is "00100," and the second password initially stored in the memory storage apparatus 100 is "123456." In that case, when the electronic apparatus 10 receives the tag identification (i.e., "00100") corresponding to the memory storage apparatus 100, the electronic apparatus 10 determines that a registration list 500 has a registration record 602 corresponding to the memory storage apparatus 100 according to the registration list 500 recorded in the electronic apparatus 10. Accordingly, the electronic apparatus 10 obtains the first password as "123456" from the registration record 602 and transmits the first password to the memory storage apparatus 100. Specifically, by the means that the electronic apparatus 10 determines whether the registration information includes the registration record corresponding to the memory storage apparatus 100, when the registration list has the first password corresponding to the memory storage apparatus 100, the first password can be transmitted directly to the memory storage apparatus 100, such that the user may access the memory storage apparatus 100 more efficiently with password protection. It should be mentioned that the registration list 500 is simply an exemplary registration list rather than a limitation to the present invention.

Figure 6A:
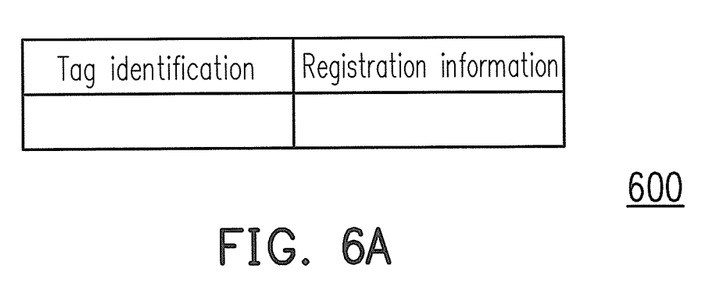
FIGS. 6A and 6B are schematic views illustrating the registration list recorded in the electronic apparatus according to the second exemplary embodiment.
Figure 6B:
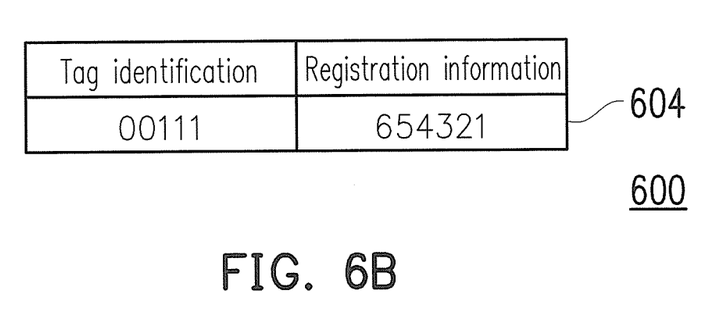

FIGS. 6A and 6B are schematic views illustrating the registration list recorded in the electronic apparatus according to the second exemplary embodiment.

Referring to FIG. 6A, in another exemplary embodiment, it is assumed that the tag identification corresponding to the memory storage apparatus 100 received by the electronic apparatus 100 is "00111," and the second password initially stored in the memory storage apparatus 100 is "654321." In that case, the electronic apparatus 10 determines that a registration list 600 does not have a registration record corresponding to the memory storage apparatus 100 according to the registration list 600 recorded in the electronic apparatus 10, and displays a log-in interface requesting the user to input password to access the memory storage apparatus 100. In the exemplary embodiment, it is assumed that the user inputs the password as "654321." Referring to FIG. 6B, since the password input by the user is identical to the second password initially stored in the memory storage apparatus 100, the electronic apparatus 10 records the password "654321" as the first password, and records the tag identification "00111" corresponding to the memory storage apparatus 100 received from the registration list 600 as well as the first password "654321" as a registration record 604. Specifically, by the means that the electronic apparatus 10 provides the user with the log-in interface and records the tag identification corresponding to the memory storage apparatus 100 as well as the first password input by the user, when the user would like to access the memory storage apparatus 100 by using the electronic apparatus 10 next time, the user does not have to input the password corresponding to the memory storage apparatus 100 again. In addition, the registration list 600 is simply an exemplary registration list and the present invention is not limited thereto.

In the exemplary embodiment, after the memory management circuit 202 of the memory storage apparatus 100 determines that the first password is identical to the second password initially stored in the memory storage apparatus 100, and when the memory management circuit 202 receives a read command from the electronic apparatus 10 or another electronic apparatus (e.g., computer host) connected to the memory storage apparatus 100 and provided that the read command instructs to read a first logic address mapped to the first physical programming unit among the logic addresses 510(0)-510(D), the memory management circuit 202 uses the first password to decode the data recorded in the first physical programming unit among the physical programming unit to obtain decoded data, and transmits the decoded data to the electronic apparatus 10 to respond to the received read command; however, the present invention is not limited thereto. For instance, in another exemplary embodiment, the memory storage apparatus 100 is divided as having a hidden divided area. The memory management circuit 202 determines whether the hidden divided area can be provided to the electronic apparatus 10 for accessing according to the first password.

In particular, in the exemplary embodiment, the password validation between the electronic apparatus 10 and the memory storage apparatus 100 is completed under the passive mode of NFC, that is, the memory storage apparatus 100 in the exemplary embodiment is not equipped with a battery. Therefore, the memory storage apparatus 100 in the exemplary embodiment is different from the memory storage apparatus described in the first exemplary embodiment. In the first exemplary embodiment, after performing NFC with the electronic apparatus, the memory storage apparatus is coupled to another electronic apparatus or computer host to be accessed. In the exemplary embodiment, the memory storage apparatus 100 may be accessed by simply being coupled to the electronic apparatus 10 that performs NFC with the memory storage apparatus 100. In other words, every flash memory can be accessed by a specific mobile device.

Figure 7:
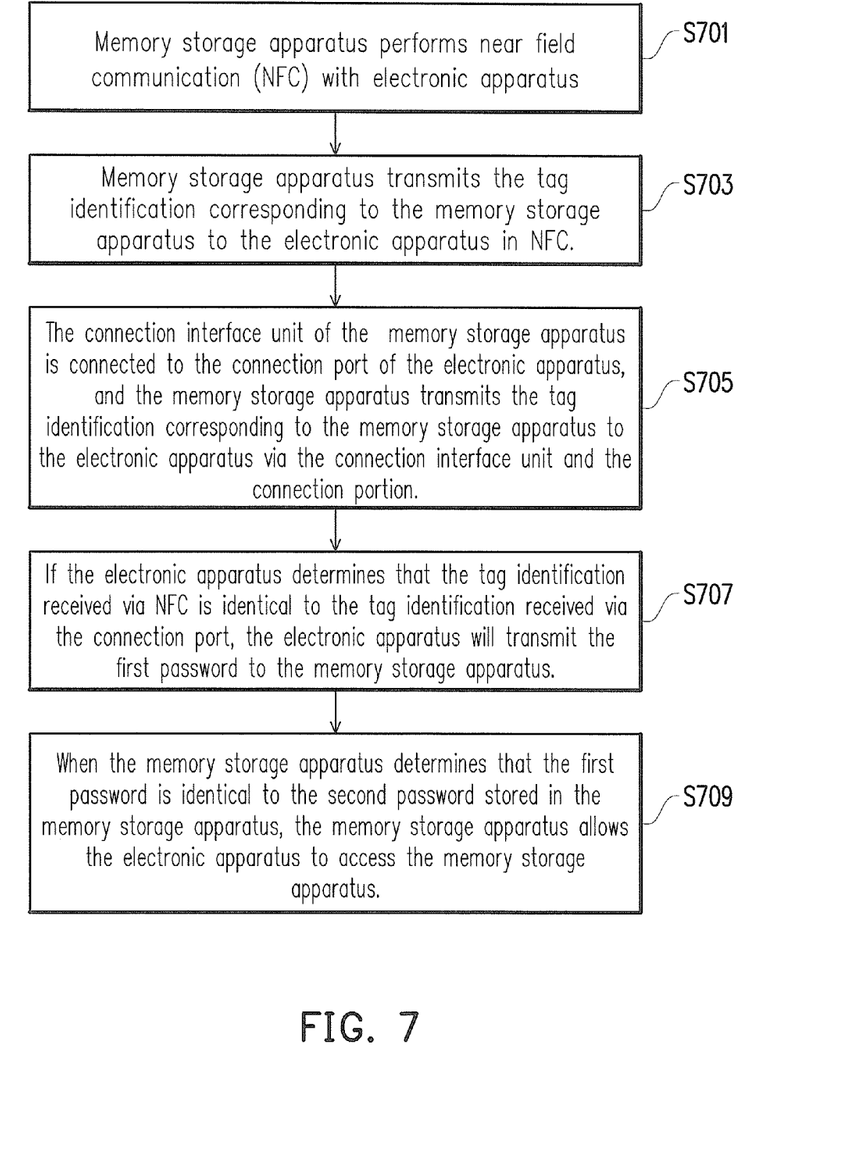
FIG. 7 is a flowchart of a data accessing method according to the second exemplary embodiment.

FIG. 7 is a flowchart of a data accessing method according to the second exemplary embodiment.

Referring to FIG. 7, in step S701, the memory storage apparatus 100 performs NFC with the electronic apparatus 10.

In step S703, the memory storage apparatus 100 transmits the tag identification corresponding to the memory storage apparatus 100 to the electronic apparatus 10 through NFC.

Subsequently, in step S705, the connection interface unit 102 of the memory storage apparatus 100 is connected to the connection port 18 of the electronic apparatus 10. Meanwhile, the memory storage apparatus 100 transmits the tag identification corresponding to the memory storage apparatus 100 to the electronic apparatus 10 via the connection interface unit 102 and the connection port 18.

In step S707, if the electronic apparatus 10 determines that the tag identification received through NFC is identical to the tag identification received via the connection port 18, the electronic apparatus 10 transmits the first password to the memory storage apparatus 100.

Thereafter, in step S709, if the memory storage apparatus 100 determines that first password is identical to the second password stored in the memory storage apparatus 100, the memory storage apparatus 100 allows the electronic apparatus 10 to access the memory storage apparatus 100.

Figure 8:
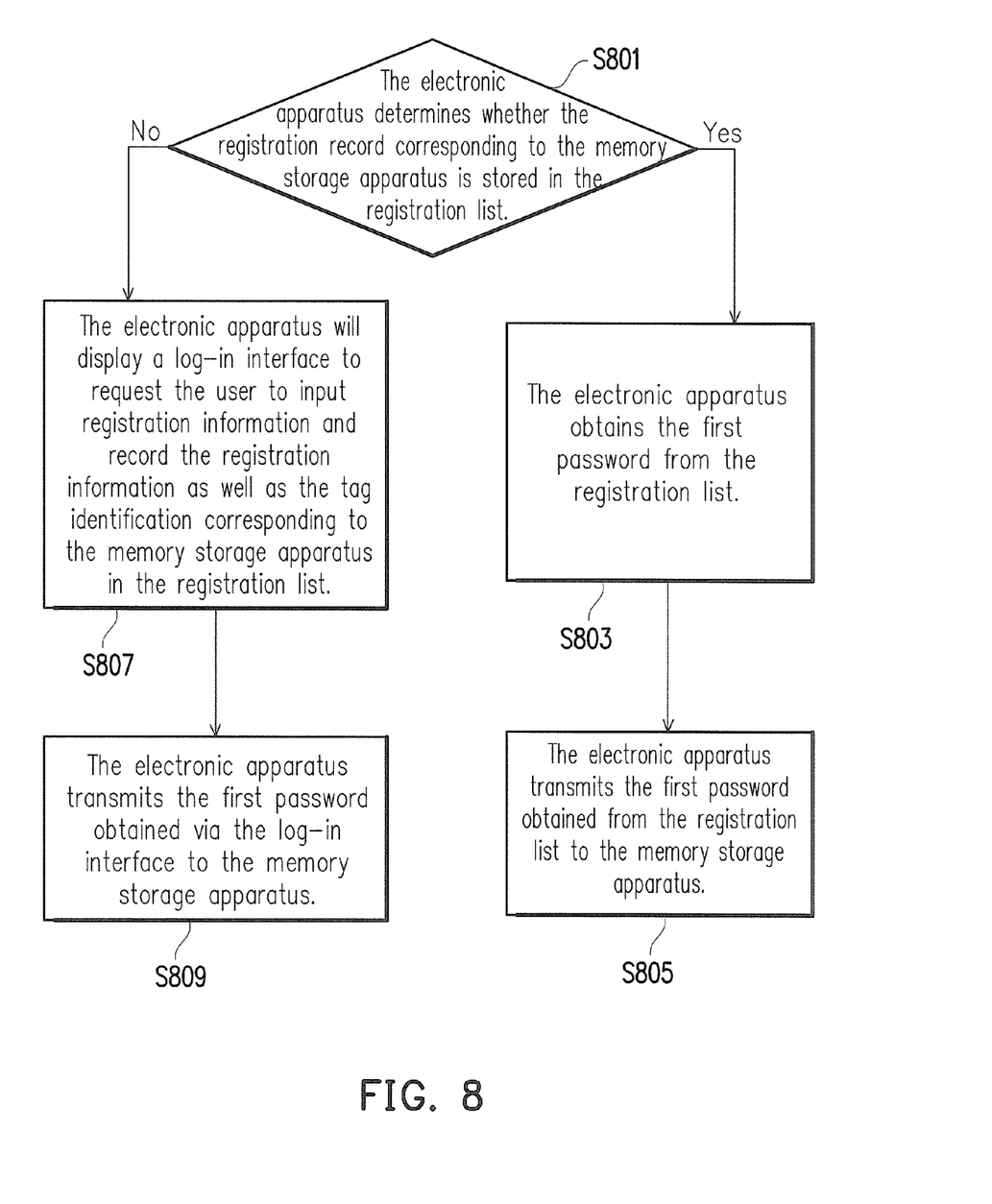
FIG. 8 is a flowchart illustrating transmission of a first password to a memory storage apparatus according to the second exemplary embodiment.

FIG. 8 is a flowchart illustrating transmission of the first password to the memory storage apparatus according to the second exemplary embodiment.

Referring to FIG. 8, in step S801, the electronic apparatus 10 determines whether the registration list recorded in the electronic apparatus 10 has the registration record corresponding to the memory storage apparatus 100.

If the electronic apparatus 10 in step S801 determines that the registration list has the registration record corresponding to the memory storage apparatus 100, subsequently, in step S803, the electronic apparatus 10 obtains the first password from the registration list.

Afterwards, in step S805, the electronic apparatus 10 transmits the first password obtained from the registration list to the memory storage apparatus 100.

If the electronic apparatus 10 in step S801 determines that the registration list does not have the registration record corresponding to the memory storage apparatus 100, subsequently, in step S807, the electronic apparatus 10 displays a log-in interface to request the user to input registration information and records the registration information as well as the tag identification corresponding to the memory storage apparatus 100 in the registration list.

Thereafter, in step S809, the electronic apparatus 10 transmits the first password obtained through log-in interface to the memory storage apparatus 100.

Based on the above, the data accessing method and system provided by the exemplary embodiments of the present invention allow password validation between the electronic apparatus and the memory storage apparatus to be completed quickly through NFC performed between the electronic apparatus and the memory storage apparatus. Moreover, only under the passive mode of NFC and provided that the password corresponding to the memory storage apparatus is not present in the electronic apparatus (i.e., the user's first usage), the electronic apparatus requests the user to input the password via the log-in interface of the electronic apparatus. With the means mentioned above, the right to access the memory storage apparatus can be controlled in a convenient and highly secure way. The previously described exemplary embodiments of the present invention have the advantages aforementioned, wherein the advantages aforementioned not required in all versions of the invention.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A data accessing method for a memory storage apparatus having a rewritable non-volatile memory module, the rewritable non-volatile memory module comprises a plurality of physical erasing units, and the physical erasing units are logically grouped into a data area, a spare area, a system area, and a replacement area, wherein a plurality of logical addresses are mapped to the physical erasing units of the data area, and grouping relations of the physical erasing units grouped to the data area, the spare area, the system area, and the replacement area change dynamically, the data accessing method comprising:

performing a near field communication (NFC) between the memory storage apparatus and a first electronic apparatus;

receiving a first password from the first electronic apparatus by the memory storage apparatus through the NFC;

recording the first password in a memory unit of the memory storage apparatus;

within a predetermined time after the first password is received from the first electronic apparatus by the memory unit of the memory storage apparatus through the NFC, connecting a connection interface unit of the memory storage apparatus to a connection port of a second electronic apparatus, within the predetermined time after the first password is received from the first electronic apparatus by the memory unit of the memory storage apparatus through the NFC, if the connection interface unit of the memory storage apparatus is not connected to the connection port of the second electronic apparatus, deleting the first password recorded in the memory unit; and if the first password recorded in the memory unit is identical to a second password stored in the memory storage apparatus, allowing the second electronic apparatus to access the memory storage apparatus by the memory storage apparatus.

2. The method according to claim 1, further comprising:
when the connection interface unit of the memory storage apparatus is disconnected to the connection port of the second electronic apparatus, deleting the first password recorded in the memory unit.

3. The method according to claim 1, wherein each of the physical erasing units comprises a plurality of physical programming units, and the logic addresses are configured to be mapped to a portion of the physical programming units, wherein the step of allowing the second electronic apparatus to access the memory storage apparatus by the memory storage apparatus comprises:

using the first password to decode data stored in a first physical programming unit among the physical programming units to obtain a decoded data and transmitting the decoded data to the second electronic apparatus in response to a read command, wherein the read command instructs to read a first logic address mapped to the first physical programming unit among the logic addresses.

4. A memory storage apparatus comprising:
a connection interface unit;
a rewritable non-volatile memory module comprises a plurality of physical erasing units, and the physical erasing units are logically grouped into a data area, a spare area, a system area, and a replacement area, wherein a plurality of logical addresses are mapped to the physical erasing units of the data area, and grouping relations of the physical erasing units grouped to the data area, the spare area, the system area, and the replacement area change dynamically; and
a memory control circuit unit coupled to the connection interface unit and the rewritable non-volatile memory module, wherein the memory control circuit unit performs a near field communication (NFC) with a first electronic apparatus, wherein the memory control circuit unit receives a first password from the first electronic apparatus through the NFC, wherein the memory control circuit unit records the first password in a memory unit of the memory storage apparatus, within a predetermined time after the memory control circuit unit receives the first password from the first electronic apparatus through the NFC, the connection interface unit of the memory storage apparatus is connected to a connection port of a second electronic apparatus, wherein, within the predetermined time after the memory control circuit unit receives the first password from the first electronic apparatus through the NFC, if the connection interface unit of the memory storage apparatus is not connected to the connection port of the second electronic apparatus, the memory control circuit unit deletes the first password recorded in the memory unit, wherein, if the memory control circuit unit determines that the first password recorded in the memory unit is identical to a second password stored in the memory storage apparatus, the memory control circuit unit allows the second electronic apparatus to access the memory storage apparatus.

5. The apparatus according to claim 4, wherein when the connection interface unit of the memory storage apparatus is disconnected to the connection port of the second electronic apparatus, the memory control circuit unit deletes the first password recorded in the memory unit.

6. The apparatus according to claim 4, wherein each of the physical erasing units comprises a plurality of physical programming units, and the logic addresses are configured to be mapped to a portion of the physical programming units, wherein in the operation of allowing the second electronic apparatus to access the memory storage apparatus, the memory control circuit unit uses the first password to decode data stored in a first physical programming unit among the physical programming units to obtain a decoded data and transmits the decoded data to the second electronic apparatus to respond to a read command, wherein the read command instructs to read a first logic address mapped to the first physical programming unit among the logic addresses.

7. A system for data accessing comprising:

a memory storage apparatus having a rewritable non-volatile memory module, the rewritable non-volatile memory module comprises a plurality of physical erasing units, and the physical erasing units are logically grouped into a data area, a spare area, a system area, and a replacement area, wherein a plurality of logical addresses are mapped to the physical erasing units of the data area, and grouping relations of the physical erasing units grouped to the data area, the spare area, the system area, and the replacement area change dynamically, and a first electronic apparatus performing a near field communication (NFC) with the memory storage apparatus, wherein the first electronic apparatus transmits a first password to the memory storage apparatus through the NFC, wherein the memory storage apparatus records the first password in a memory unit of the memory storage apparatus, wherein, within a predetermined time after the first electronic apparatus transmits the first password to the memory unit of the memory storage apparatus through the NFC, a connection interface unit of the memory storage apparatus is connected to a connection port of a second electronic apparatus, wherein, within the predetermined time after the first password is transmitted to the memory unit of the memory storage apparatus by the first electronic apparatus through the NFC, if the memory storage apparatus determines that the connection interface unit of the memory storage apparatus is not connected to the connection port of the second electronic apparatus, the first password recorded in the memory unit is deleted, wherein, if the memory storage apparatus determines that the first password recorded in the memory unit is identical to a second password stored in the memory storage apparatus, the memory storage apparatus allows the second electronic apparatus to access the memory storage apparatus.

8. The system according to claim 7, wherein when the connection interface unit of the memory storage apparatus is disconnected to the connection port of the second electronic apparatus, the memory storage apparatus deletes the first password recorded in the memory unit.

9. The system according to claim 7, wherein each of the physical erasing units comprises a plurality of physical programming units, and the logic addresses are configured to be mapped to a portion of the physical programming units, wherein in the operation of allowing the second electronic apparatus to access the memory storage apparatus, the memory storage apparatus uses the first password to decode data stored in a first physical programming unit among the physical programming units to obtain a decoded data and transmits the decoded data to the second electronic apparatus to respond to a read command, wherein the read command instructs to read a first logic address mapped to the first physical programming unit among the logic addresses.

* * * * *